United States Patent [19]

Dickey et al.

[11] Patent Number: 4,472,641
[45] Date of Patent: Sep. 18, 1984

[54] POWER SUPPLY APPARATUS

[75] Inventors: David E. Dickey, Bethel Park; Peter Wood, Murrysville, both of Pa.

[73] Assignee: Westinghouse Electric Corp., Pittsburgh, Pa.

[21] Appl. No.: 461,882

[22] Filed: Jan. 28, 1983

[51] Int. Cl.³ .............................................. H02J 3/32
[52] U.S. Cl. .................................... 307/46; 307/48; 307/76; 363/82; 363/70
[58] Field of Search ................ 307/44, 45, 46, 48, 307/75, 76, 82, 84; 363/69, 70; 320/6

[56] References Cited

U.S. PATENT DOCUMENTS

| | | | |
|---|---|---|---|
| 3,384,806 | 5/1968 | Hartman | 322/2 |
| 3,421,067 | 1/1969 | Wilson et al. | 320/14 |
| 3,696,286 | 10/1972 | Ule | 320/40 |
| 3,699,352 | 10/1972 | Silver | 307/75 |
| 3,895,368 | 7/1975 | Rym | 340/572 |
| 3,909,685 | 9/1975 | Baker et al. | 318/139 |
| 3,956,638 | 5/1976 | Ahrens et al. | 307/44 X |
| 4,016,473 | 4/1977 | Newman | 320/14 |
| 4,017,779 | 4/1977 | McDonald et al. | 320/15 |
| 4,079,495 | 3/1978 | Hufnagel | 363/71 |
| 4,134,057 | 1/1979 | Portmann | 320/61 |
| 4,175,249 | 11/1979 | Gruber | 323/271 |
| 4,204,147 | 5/1980 | Larrabee | 323/257 |
| 4,276,590 | 6/1981 | Hansel et al. | 363/71 |
| 4,281,278 | 7/1981 | Bilsky et al. | 320/13 |
| 4,287,465 | 9/1981 | Godard et al. | 320/56 |
| 4,306,183 | 12/1981 | Wright | 320/39 |
| 4,327,318 | 4/1982 | Kwon et al. | 320/39 |
| 4,340,823 | 7/1982 | Miyazawa | 307/66 |

Primary Examiner—Reinhard J. Eisenzopf
Assistant Examiner—Derek Jennings
Attorney, Agent, or Firm—Z. L. Dermer

[57] ABSTRACT

The outputs of a plurality of modules or generators of electrical energy, such as fuel cells, chemical storage batteries, solar cells, MHD generators and the like, whose outputs are different are consolidated efficiently. The modules supply a power distribution system through an inverter. The efficiency is achieved by interconnecting the modules with an alternating voltage supply and electronic valves so controlled that the alternating-voltage supply absorbs power from modules whose output voltage is greater than the voltage at which the inverter operates and supplies this power as a booster to modules whose output voltage is less than the voltage at which the inverter operates.

12 Claims, 9 Drawing Figures

POWER SUPPLY APPARATUS

REFERENCES TO RELATED APPLICATIONS

Application Ser. No. 435,800 filed Oct. 21, 1982, to David E. Dickey and Peter Wood for Fuel Cell Power Conditioning Interface Circuitry (herein Dickey) assigned to Westinghouse Electric Corporation. Dickey is incorporated in this application by reference.

BACKGROUND OF THE INVENTION

This invention relates to power-supply apparatus in which modular energy generators such as fuel cells, solar cells, magnetic hydrodynamic generators and the like supply commercial quantities of electrical power in relatively large blocks to a power distribution system. This invention has particular relationship to apparatus in which the energy-generator modules have different outputs and are interfaced with the terminals through which power flows to the distribution system so that the outputs of the generators are appropriately consolidated. The problem presented by energy-generator modules which have different outputs is frequently encountered. Some of the modules in an installation may require replacement by new modules while others still have a useful life. In this case the new modules have a higher output than the old modules. The demand that modules have equal outputs imposes strict and difficult tolerances on the manufacture of the modules, materially increasing their costs. Interfacing which permits the use of modules of different outputs without substantial loss of power permits relaxation of strict tolerance and reduction in cost. A like problem arises where, as is usual, modules are connected in series-parallel arrays. Low efficiency, high resistance or short circuits in individual modules force other modules to alter their outputs and to operate at less than their optimum efficiency so that output voltages of all parallel strings of series modules are maintained equal.

The energy generator modules supply direct current that is converted into alternating current which flows into the distribution system. Typically a single common inverter is provided between the modules and the distribution system. It has been proposed, in an effort to solve the problem raised by the unequal outputs of the modules, to interpose several small inverters between the modules and the distribution system. Another solution is to provide DC-DC converters between the modules and a common inverter. Such solutions are costly.

Another expedient for solving the problem in the case of fuel cells is to vary the flow of the fuel gas, usually hydrogen, and/or the oxidizing gas, usually oxygen, to the cells of the different modules. This expedient demands a complicated gas-valve arrangement and is also costly.

Dickey discloses a protective circuit interfaced between fuel-cell generator modules and the terminals connected to the distribution network through an inverter. In this circuit the modules are connected in parallel through diodes to a DC bus, which in turn is connected to the inverter. Each module automatically adjusts its output current to match the DC bus voltage in accordance with voltage-current curves determined by module fuel and oxidizer pressure, temperature and flow relationship. The individual module efficiencies of the fuel cells are held within acceptable limits by a control system which adjusts module parameters as required. While it is contemplated that the apparatus disclosed by Dickey will operate satisfactorily, it is desirable that the efficiency of operation of the energy-generator modules be substantially improved. It is an object of this invention to provide power supply apparatus in which a plurality of modules of energy generators, such as fuel cells, provide large blocks of power to a distribution network, which apparatus shall include a network interfaced between the modules and the distribution network which network shall operate electrically rather than mechanically to consolidate the outputs of the modules so that they supply their individual power increments with high efficiency. Stated another way, it is an object of this invention to provide power-supply apparatus including a plurality of DC sources or modules supplying a distribution system in parallel and consolidated so that each module or parallel branch produces power at its maximum efficiency even though the branch output voltages at maximum efficiency are unequal.

SUMMARY OF THE INVENTION

This invention arises from the discovery that significant mechanical design simplifications and cost savings can be achieved by varying as required the electrical loading of each module to control and maximize the efficiency of the modules rather than by trying to effect the control by separate inverters or by mechanical gas valves. The electrical loading of the modules is varied in such a way that high output modules feed excess power into the current paths of low-output modules and the outputs of low-output modules are boosted by power derived from the high-output modules. The supply of power to the distribution system is equalized for the modules whose output differs. In the consolidation interface network in the practice of this invention, a differential converter is connected to each module. Each converter is supplied with alternating voltage which has a voltage magnitude approximately equal to about one-half the anticipated maximum variation among the modules. As used in this application, "voltage magnitude" means the mean voltage that is delivered as distinct from the amplitudes of the alternating voltage. In the case of fuel cells, the cells connected in series to form a module may have an output of 2000 volts. The maximum variation among the modules may be ±5%, i.e., 10% overall. In this case the alternating voltage supply may have a magnitude of 100 volts. Each differential converter also includes electronic valves which control the conduction of the alternating current. For the high-output modules conduction is initiated late in the positive half-periods of the alternating voltage so that the conduction is predominant during the negative half-periods and excess power is absorbed by the alternating supply from the modules. For the low-output modules conduction is initiated early in the positive half periods so that power is absorbed by the modules from the alternating supply. The modules are thus interconnected so that any excess power is used and not suppressed as taught by the prior art.

BRIEF DESCRIPTION OF THE DRAWINGS

For a better understanding of this invention, both as to its organization and as to its method of operation, together with additional objects and advantages thereof, reference is made to the following description taken in connection with the accompaying drawings, in which.

DETAILED DESCRIPTION OF THE PREFERRED EMBODIMENT

Figure 1:
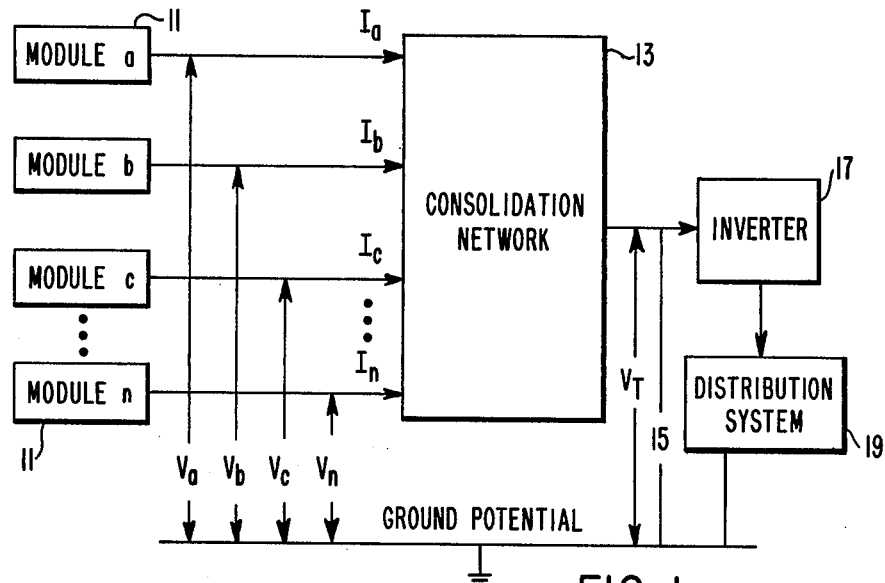
FIG. 1 is a block diagram showing generally the principle components of power-supply apparatus in which the power is derived from generators of electrical energy such as fuel cells.

The apparatus shown in FIG. 1 includes a bank of modules 11 of energy generators such as fuel cells, solar cells, MHD's or the like. Each individual module 11 typically is composed of a plurality of generators, for example, fuel cells, connected in series. The different modules 11 are identified by letters a, b, c—n. Each module has a voltage output $V_a$, $V_b$, $V_c$,—$V_n$. This voltage is designated generally as $V_i$. The current from each module is identified $I_a$, $I_b$, $I_c$—$I_n$ and generally as $I_i$. The currents $I_i$ are supplied to a consolidation network 13. The output of this network is fed into buses 15 which are connected to an inverter 17. The inverter 17 converts the direct current which flows through the buses 15 into alternating current. The alternating current is supplied to a power distribution system 19. Instead of an inverter 17, converters of other types, such as a DC-DC converter may be interposed between the consolidation network 13 and the distribution system 19.

A fundamental constraint of the energy transfer from the modules 11 to the buses 15 of apparatus such as is shown in FIG. 1 is given by the inequality:

$$\sum_{i=1}^{i=n} V_i I_i \neq V_T I_T \quad (1)$$

where $V_T$ and $I_T$ are the voltage across the buses 15 and the current which flows through the buses. This constraint demands that energy must be continuously supplied to or absorbed from the consolidation network 13. In the absence of the constraint, the relationship between the individual voltages and currents of the modules and the voltage and current at the buses is given by the equation:

$$\sum_{i=1}^{i=n} V_i I_i = V_T \sum_{i=1}^{i=n} I_i \quad (2)$$

If this equation governs the operation, no energy source, which supplies additional power, or energy sink, which absorbs excess power from the modules, is required. For operation as defined by equation (2), the consolidation network 13 must provide means by which energy can be transferred from the current paths of some modules to the current paths of other modules consistent with Kirchoff's law for current; i.e., $$\sum_{i=1}^{i=n} I_i = I_T \quad (3)$$

In the case of power supply apparatus such as is under consideration here, $V_T$ has a magnitude between the maximum and minimum voltage $V_i$. There are also ohmic paths between the modules 11, the consolidation network 13 and the buses 15 such that all currents $I_i$ contribute to $I_T$ as defined in equation (3). The energy is transferred from the paths of modules for which $V_i > V_T$ to the paths of modules for which $V_i > V_T$. No energy needs to be transferred or absorbed outside of the consolidation network. The transfer is effected in the practice of this invention by differential voltage converters (herein DVC). Aging studies on fuel cells indicate that voltage shifts of about 10% are to be anticipated between different modules. With only one module off nominal output by the maximum magnitude, the maximum power which would be transferred to or from a current path of a module would be some magnitude less than 10% of its output. In a fuel cell system in which 50% of the modules have been replaced so that there are 50% new modules and 50% old, end-of-life, modules, the current path of the consolidation network associated with each module would handle about 5% of the total current output. It is a valid assumption that the cost of the differential converters, which predominantly involve electronic circuits, is roughly proportional to the power handled. The consolidated network 13 in which differential voltage converters perform the consolidation function are then more economical than prior art expedients.

Figure 2:
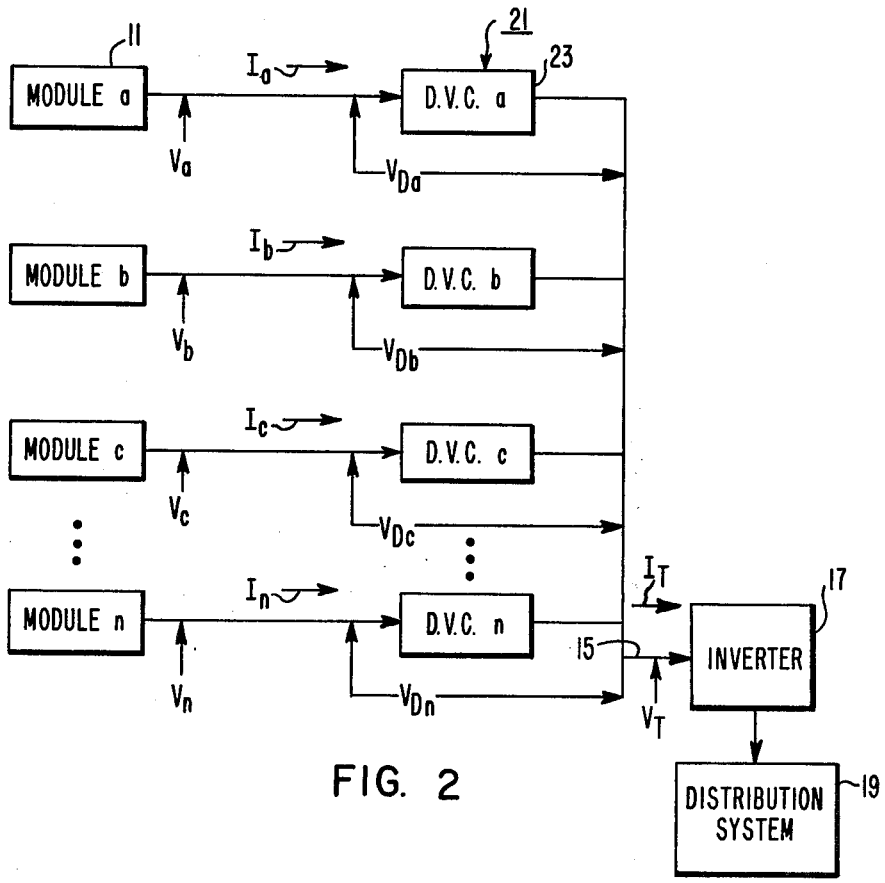
FIG. 2 is a block diagram showing generally the principal components of such apparatus in accordance with this invention.

In the apparatus shown in FIG. 2, the consolidation network 21 includes a plurality of differential voltage converters 23. Each module is connected to a converter. The converters 23 are labelled DVCa, DVCb, DVCc—DVCn to correspond to the modules a through n to which they are connected. The differential converters DVCa through DVCn are interconnected with the modules 11 so that the outputs of the modules for which $V_i > V_T$ is boosted through their associated converters by the modules for which $V_i > V_T$. Where the currents $I_a$ through $I_n$ differ, as usually occurs, the bus voltage $V_T$ is approximately equal to the average of the voltages $V_{Da}$ through $V_{Dn}$; i.e., $$V_T \approx \frac{V_{Da} + V_{Db} + V_{Dc} + - V_{Dn}}{n} \quad (4)$$

Where the current $I_a$ through $I_n$ are equal. $V_T$ is equal to this average.

Figure 3:
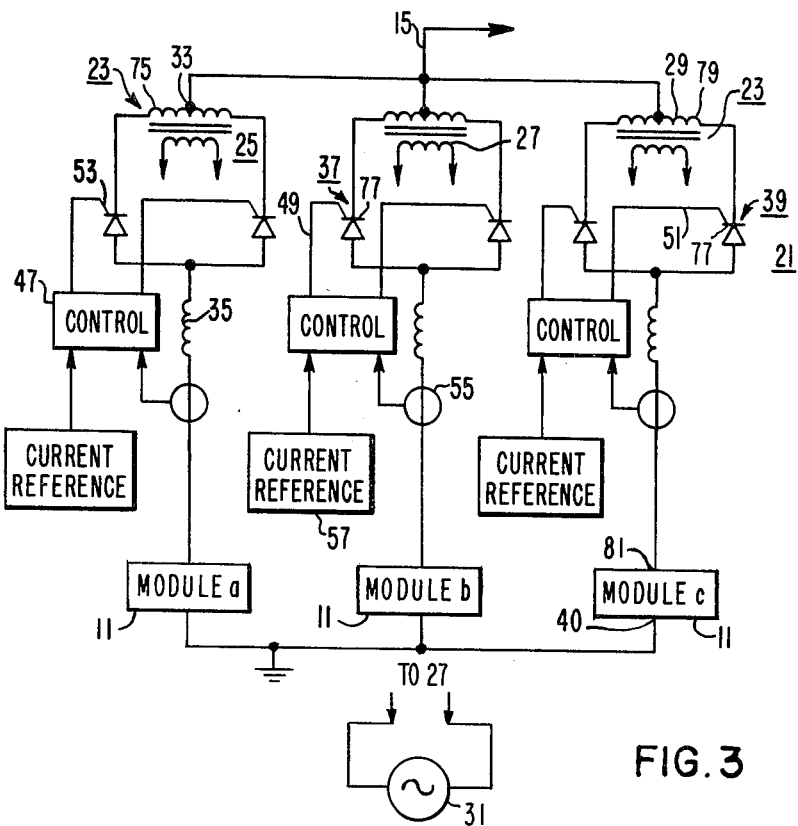
FIG. 3 is a schematic showing a consolidation network included in power supply apparatus according to this invention.

As shown in FIG. 3 each differential voltage converter 23 has a transformer 25 having a primary 27 and a center-tapped secondary 29. The primaries 27 are supplied from a common source 31 which may derive its power from the distribution system 19. Typically the source 31 may be a 50 or 60 hertz source. The center taps 33 of the secondaries are connected in common to the "hot" bus 15. The positive pole 81 of each module 11 is connected to the associated secondary 29 through a choke 35 and thyristors 37 and 39 (silicon-controlled rectifier or power transistors or the like). The negative poles 40 of the modules 11 are connected to the ground bus 15 or are grounded. The thyristors 37 and 39 are connected to opposite terminals of the secondary 29 and are capable of conducting alternately as the polarity of the associated secondary changes.

Figure 4:
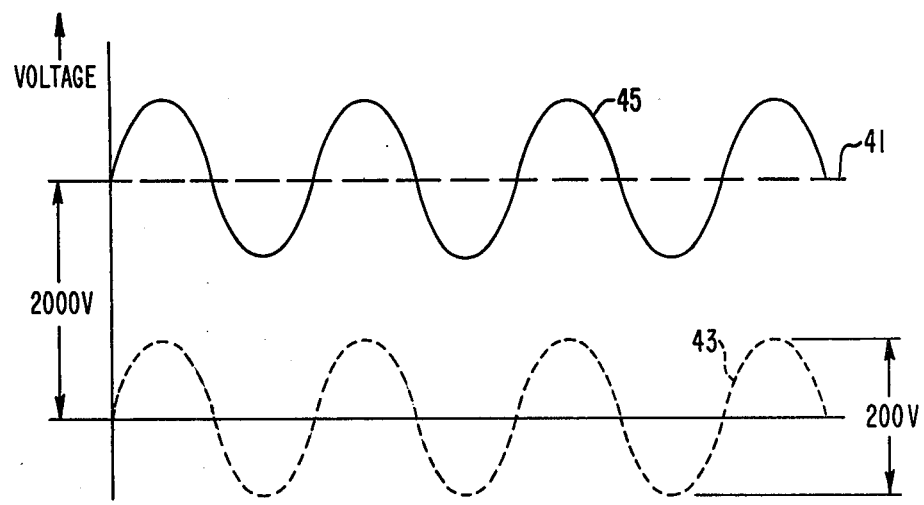
FIG. 4 is a graph showing typical relationship between the module voltage and the alternating voltage supplied to the differential converters.

The magnitude of the alternating voltage supplied by the secondaries 29 are typically relatively small compared to the direct-current voltage of the modules. The relationship for a module 11 is shown in FIG. 4. Voltage is plotted vertically and time horizontally. The broken line 41 parallel to the time axis is a plot of the voltage output of a module. The broken-line sine curve 43 along the time axis is a plot of the alternating voltage supplied by secondary 29. The full line curve 45 is a plot of the sum of these voltages. For fuel cells, the module voltage is about 2000. The magnitude of alternating voltage should be equal to the variation in voltage output among the modules. This variation is typically 10%; i.e., ±5%. The magnitude of the alternating voltage is then 100 volts.

Each pair of thyristors 37 and 39 is provided with a conventional control 47. The control 47 has output conductors 49 and 51 connected to the gates 53 of the thyristors to render them conducting in opposite phase. A signal dependent on the current supplied by each module 11, derived from a current sensor such as a current transformer 55, is impressed on the control 47. This signal is compared to a current reference 57 derived in a conventional manner. The magnitude of the current reference may be common to all controls 47 but usually must be tailored to the voltage-current characteristics of each module. The control signal impressed on the gates 53 from the conductors 49 and 51 are determined by the comparison of the signal from the current transformer and the current reference.

Figure 5A:
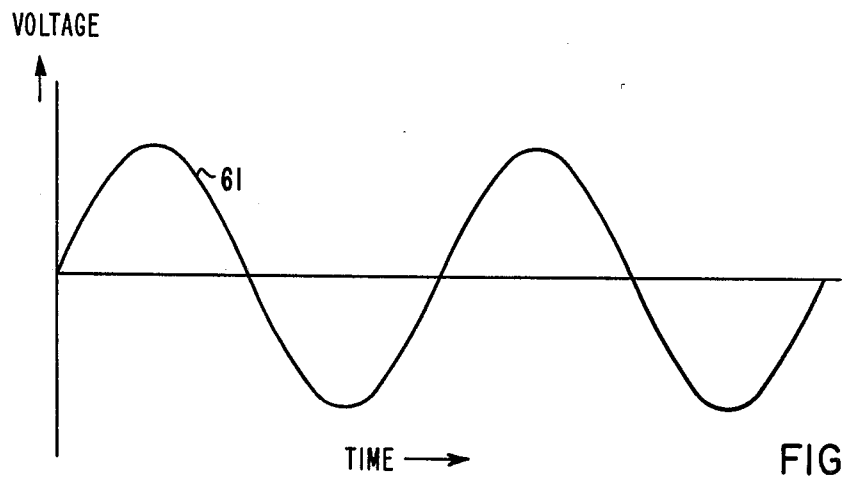
FIGS. 5A, 5B and 5C are graphs which serves to explain the oeration of FIG. 3.
Figure 5B:
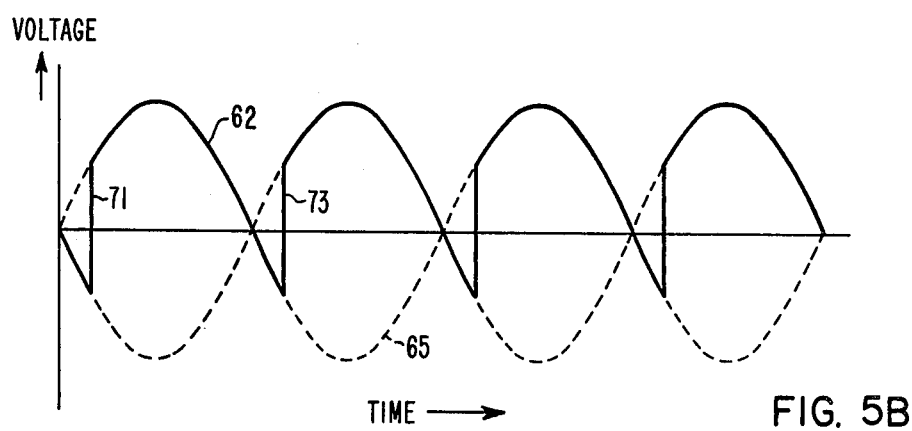
Figure 5C:
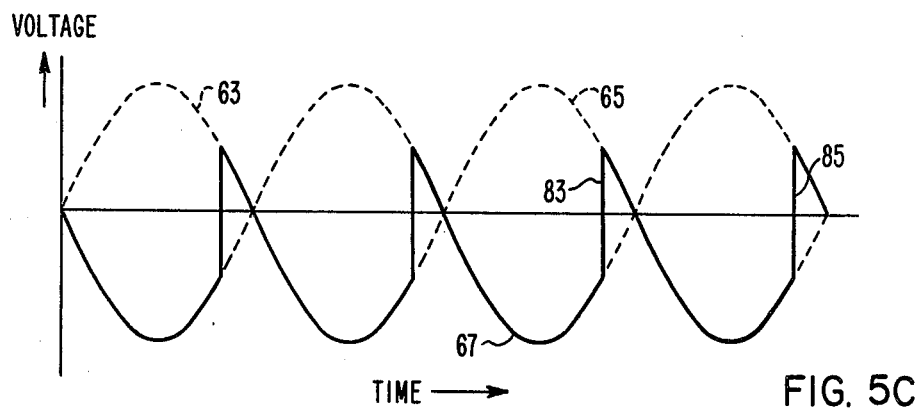

The operation of the consolidation network 21 shown in FIG. 3 will now be described with reference to FIGS. 5A, 5B and 5C. In these views voltage is plotted vertically and time horizontally. The points along a line parallel to the voltage axis through all three graphs define the same instant of time. The sine curve 61 in FIG. 5A is a plot of the alternating voltage impressed by the primary 27. The curves 62 and 63 in FIGS. 5B and 5C are plots of the voltage impressed across thyristor 37 of each differential converter 23 by the section of secondary 29 whose terminal 75 is connected to the collector 77 of the thyristor. The curves 65 and 67 in FIGS. 5B and 5C are plots of the voltage impressed on thyristor 39 by the section of the secondary 29 of each differential converter 23 whose terminal 79 is connected to the collector 77 of this thyristor. The sections of curves 62-67 which are in heavy lines represent the parts of each period during which the associated thyristor 37 or 39 is conducting. In the case of each module having a lower output than the level of the desired voltage of buses 15, i.e. $V_i > V_T$, the thyristors are fired early in the positive half-periods of the alternating current as indicated by the vertical lines 71 and 73 of FIG. 5B and the curve sections in heavy lines following the vertical lines. The firing instants represented by line 71 are the instants when thyristor 37 is fired; the firing instants for thyristor 39 are represented by lines 73. During the positive half periods for thyristor 37, terminal 75 of the secondary 29 to which the collector 77 of thyristor 37 is connected is positive and the opposite terminal 79 negative. For thyristor 39, terminal 79 is positive and terminal 75 is negative during the opposite positive half period.

The expression "early in the positive half period" means within the first quarter period; i.e., the first 90°, from the start of the half period. The angle of firing is determined by the relationship between the signal derived from the current sensor 55 of the differential converter and the current reference. This relationship in turn depends on the departure of the output of the associated module from the selected or desired output of the buses 15; i.e., in $V_T - V_i$. If this departure is high the thyristors are fired as early as 5° from the start of the positive half period or earlier; if this departure is low the firing may occur late in the first quarter period, for example at 75° or 80° from the start of the positive half period. The firing instant is automatically adjusted as the output of the module 11 varies.

When thyristor 37 is fired, current is conducted to the bus 15 in a circuit extending as follows: pole 81, choke 35, thyristor 37, the section between 75 and 33 of the secondary 29 to the bus 15. During the succeeding half period current flows as follows: pole 81, choke 35, thyristor 39, section 79-33 of secondary 29 to the bus 15. The conduction of thyristor 39 after 37 conducts impresses a negative voltage equal to twice the voltage across section 79-33 across thyristor 37 rendering the latter nonconducting. In the same way thyristor 39 is rendered nonconducting when thyristor 37 is fired after 39. When the thyristors 37 and 39 are fired early, current is conducted predominantly during the positive half-periods of the supply 31. Power from this supply is transferred to buses 15 boosting the output of the module 11.

FIG. 5C graphically presents the operation for a module whose output exceeds the selected output; i.e., where $V_i > V_T$. In this case the thyristors 37 and 39 are fired later in the positive half periods as represented by the vertical lines 83 for 37 and 85 for 39. The expression "late in the positive half periods" means that firing takes place during the second quarter between 90° and 180°, of each positive half-period. The angle in the half-period when the thyristors are fired is dependent upon the departure of the module output from the selected output; i.e., on $V_i - V_T$. For relatively small departure, the firing may occur at 100° or 110° from the start of the positive half period; for high departure, the firing may occur at 170° or 175°. During the conduction of the thyristors the alternating voltage is predominantly negative. The module is supplying power to the source 31 and through the source to the modules for which the output is lower than the selected output.

Figure 6:
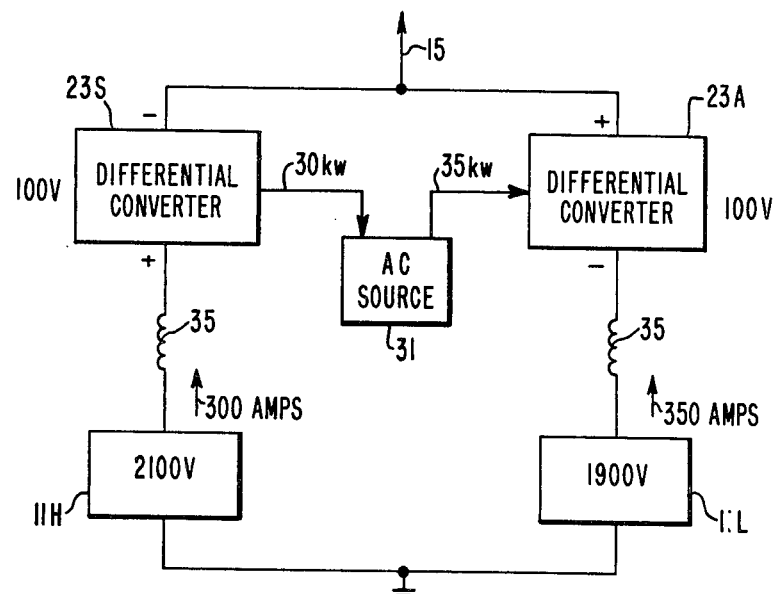
FIG. 6 is a block diagram showing the operating relationship; in the practice of this invention, between two modules having different ouputs.

The transfer of power is illustrated in FIG. 6. It is assumed that the output of module 11H is 2100 V and of module 11L 1900 V and that the higher-output module 11H is delivering 300 amperes and the lower-output module 11L 350 amperes. It is also assumed that the combined output of the two modules to the buses 15 is 1.3 megawatts, 650 amperes at 2000 volts. Under these circumstances differential converter 23S connected to module 11H delivers 30 kw to the common source 31 (FIG. 3) and differential converter 23A absorbs 35 kw from the common source 31.

FIG. 6 reveals that the lower-voltage output module 11L delivers higher current than the higher-voltage output module 11H. The operation of fuel cells may be such that such differences occur, or may be such that the currents and transferred energies are equal. The current reference 57 (FIG. 3) for each module should be set in dependence upon the voltage-current characteristic of the module.

Figure 7:
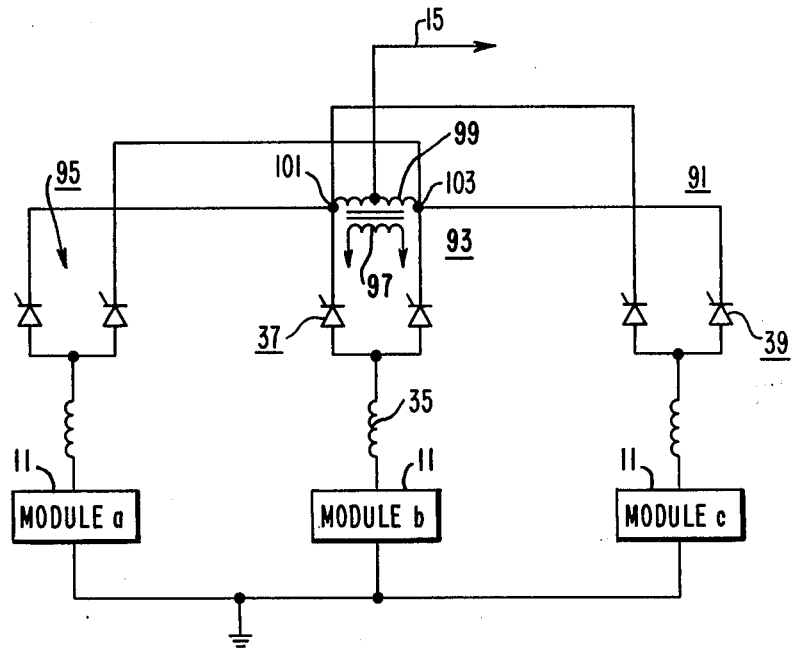
FIG. 7 is a schematic showing the consolidation network of a modification of this invention.

FIG. 7 shows a modification of this invention. In this case the consolidation network 91 includes a single transformer 93 for supplying the differential voltage converters 95 connected to each of the modules 11. The transformer 93 includes a primary 97 and a center tapped secondary 99. The thyristors 37 are connected in parallel to one terminal 101 of the secondary and the thyristors 39 to the opposite terminal 103. The operation of this modification is as described above.

While preferred embodiments of this invention have been disclosed above, many modifications thereof are feasible. This invention is not to be restricted except insofar as is necessitated by the spirit of the prior art.

What we claim is:

1. Apparatus for supplying power to a power-distribution system, the said apparatus including a plurality of generators of electrical energy, said generators operating at different output voltages, the voltage of each generator being herein designated as $V_i$;

output terminals common to said energy generators connected between said generators and said distribution system for transmitting the power generated by said generators to said distribution system, said terminals operating at a voltage herein designated as $V_T$;

and differential-converter means, connected between said generators and said terminals, for consolidating the different outputs of said generators, the said differential converter means including means of interconnecting said generators so that power is supplied from the current paths of generators for which $V_i > V_T$ to the current paths of generators for which $V_i > V_T$, whereby power is transmitted from said generators to said output terminals efficiently.

2. Apparatus for supplying power to a power distribution system, the said apparatus including a plurality of generators of electrical energy, said generators operating at different output voltages, the voltage of each generator being herein designated as $V_i$, a converter, common to said generators, connected between said generators and said distribution system, for converting the power of said generators to meet the demands of said distribution system, said converter operating at a voltage herein designated as $V_T$, and a differential-converter means connected between said generators and said power converter, for consolidating the different outputs of said generators, the said differential-converter means including means of interconnecting said generators so that power is supplied by the current paths of generators for which $V_i > V_T$ to the current paths of generator for which $V_i > V_T$, whereby power is transmitted efficiently from said generators to said power converter.

3. The apparatus of claim 1 wherein the differential-converter means includes a separate differential converter for each energy generator.

4. The apparatus of claim 2 wherein the differential-converter means included a separate differential converter connected for each energy generator.

5. Apparatus for supplying power to a power-distribution system, the said apparatus including a plurality of generators of electrical energy, said generators operating at different output voltages, the voltage of each generator being herein designated as $V_i$;

output terminals common to said energy generators connected between said generators and said distribution system, said terminals operating at a voltage herein designated as $V_T$; and a separate differential converter, connected between each said generator and said terminals, for consolidating the different outputs of said generators, each of said differential converters including, alternating-current power supply means, electronic valve means, connected to said supply means, for governing the flow of power between said alternating-current supply means, and said output terminals and control means for said valve means, said control means rendering the valve means conducting late in the positive half period of said alternating current in the differential converter of each generator for which $V_i > V_T$, so that power is supplied from the current path of each of said last-named generators, through said alternating-current supply, to the current paths of the generators for which $V_i > V_T$, and said control means rendering the valve means conducting early in the positive half periods of said alternating current in the differential converters for each generator for which $V_i > V_T$ so that power from said alternating-current supply, derived from the generators for which $V_i > V_T$, is supplied, as aforesaid, to the current paths of each of said generators for which $V_i > V_T$ to boost the outputs of each of said last-named generators, whereby power is supplied by said generators to said output terminals efficiently.

6. Apparatus for supplying power to a power-distribution system, the said apparatus including a plurality of generators of electrical energy, said generators operating at different output voltages, the voltage of each generator being herein designated as $V_i$, a converter common to said generators, connected between said generators and said distribution system, for converting the power of said generators to meet the demands of said distribution system, said power converter operating at a voltage herein designated as $V_T$, and a separate differential converter connected between each of said generators and said power converter, for consolidating the different power outputs of said generators, each of said differential converters including alternating-current power supply means, electronic valve means, connected to said supply means, for governing the flow of power between said alternating-current supply means and said power converter, and control means for said valve means, said control means rendering the valve means conducting late in the positive half periods of said alternating current in the differential converter of each generator for which $V_i > V_T$ so that power is supplied from the current path of each of said last-named generators through said alternating-current supply to the current paths of the generators for which $V_i > V_T$, and said control means rendering the valve means conducting early in the positive half periods of said alternating current in the differential converter of each of said generators for which $V_i < V_T$ so that power from said alternating-current supply, derived from the generators for which $V_i > V_T$, is supplied, as aforesaid, to the current paths of each of said generators for which $V_i < V_T$ to boost the output of each of said last-named generators, whereby power is supplied from said generators to said power converter efficiently.

7. The apparatus of claim 5 wherein the voltage $V_i$ of each generator is substantially greater than the magnitude of the alternating voltage.

8. The apparatus of claim 6 wherein the voltage $V_i$ of each generator is substantially greater than the magnitude of the alternating voltage.

9. The apparatus of claim 5 wherein the magnitude of the alternating voltage is substantially equal to approximately one-half the maximum variation of the output of the modules.

10. The apparatus of claim 6 wherein the magnitude of the alternating voltage is substantially equal to approximately one-half the maximum variation of the output of the modules.

11. The apparatus according to claim 5 wherein the alternating power-supply means derive their power from a common source.

12. The apparatus according to claim 6 wherein the alternating power-supply means derive their power from a common source.

* * * * *